Figure 1:
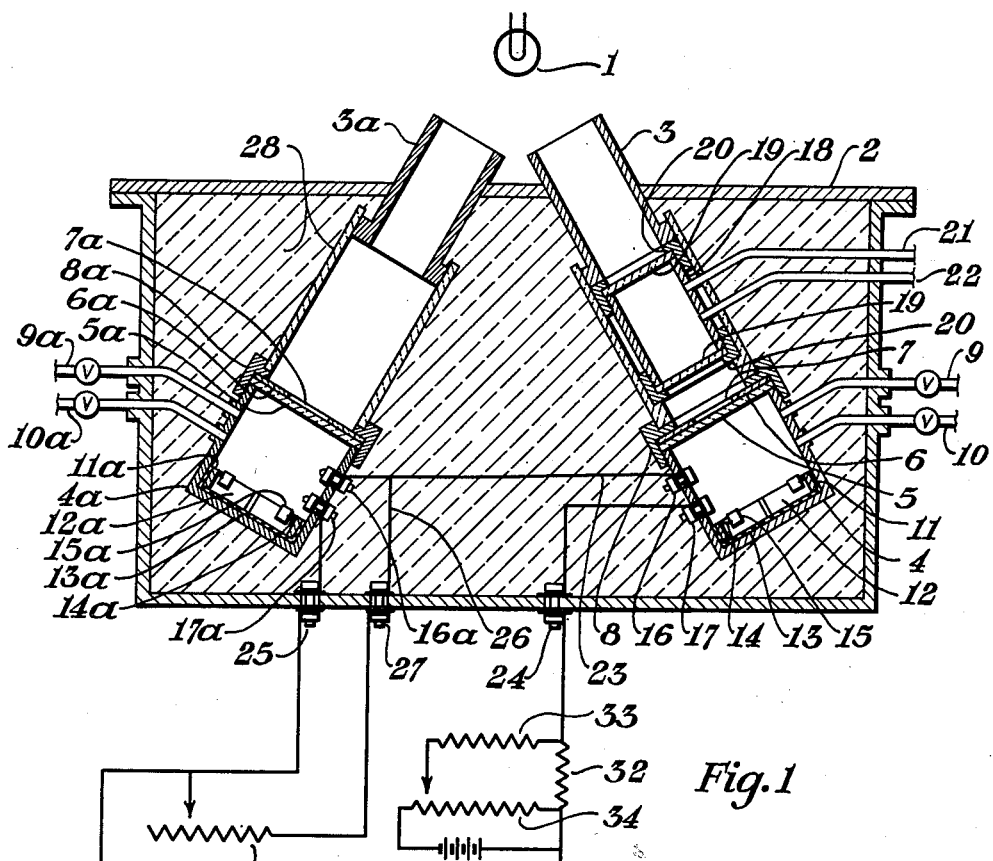

Oct. 16, 1945.  N. WRIGHT  2,386,831
METHOD AND APPARATUS FOR CONTINUOUS ANALYSIS OF ORGANIC MIXTURES WHILE
IN MOTION AND FOR CONTROL OF SYSTEMS COMPRISING SUCH MIXTURES
Filed Sept. 2, 1942  2 Sheets-Sheet 1

INVENTOR.
Norman Wright
BY
Griswold & Burdick
ATTORNEYS

Oct. 16, 1945.  N. WRIGHT  2,386,831
METHOD AND APPARATUS FOR CONTINUOUS ANALYSIS OF ORGANIC MIXTURES WHILE
IN MOTION AND FOR CONTROL OF SYSTEMS COMPRISING SUCH MIXTURES
Filed Sept. 2, 1942  2 Sheets-Sheet 2

INVENTOR.
Norman Wright
BY
Griswold & Burdick
ATTORNEYS

Patented Oct. 16, 1945

2,386,831

UNITED STATES PATENT OFFICE 2,386,831

METHOD AND APPARATUS FOR CONTINUOUS ANALYSIS OF ORGANIC MIXTURES WHILE IN MOTION AND FOR CONTROL OF SYSTEMS COMPRISING SUCH MIXTURES

Norman Wright, Midland, Mich., assignor to The Dow Chemical Company, Midland, Mich., a corporation of Michigan Application September 2, 1942, Serial No. 457,108

12 Claims. (Cl. 202—40)

This invention concerns a method and apparatus for continuously analyzing an organic mixture during travel to, through, or from a system for handling the same and also for automatically controlling such system in accordance with the analysis of the mixture. The invention is particularly concerned with a method for continuously analyzing a mixture of butylene and butadiene during separation of these hydrocarbons by distillation in the presence of ammonia and for automatically controlling the distillation in accordance with the analysis to obtain optimum distilling efficiency, but it may be applied in analyzing continuously other solid, liquid, or gaseous organic mixtures and in controlling other systems for handling organic mixtures. For instance, it may be applied in controlling reaction systems wherein the mixtures to be analyzed are produced or consumed, or in controlling systems for mixing or blending the substances to be analyzed with one another or with other substances to form blended products; or it may be applied to systems wherein the organic mixture under consideration is to be separated into its components by extraction, etc. Although the kinds of systems to which the invention may be adapted vary widely, the invention is particularly concerned with systems in which the mixtures to be analyzed are in motion, e. g. in a state of flow.

The invention is restricted to the analysis or control of mixtures containing two or more organic compounds having different light absorption bands. It is, of course, known that heteratomic molecules, i. e., molecules containing more than one kind of element, as distinguished from homoatomic molecules, such as those of nitrogen or oxygen, have the property at room temperature or thereabout of absorbing light energy of only certain wave lengths to produce spectra having bands which characterize the substance under treatment, and various photo methods for analyzing a mixture of a single heteratomic substance and one or more homoatomic substances have been proposed. However, such known photoanalytical methods are either not adapted, or are poorly adapted, to the direct analysis of organic mixtures, which of course contain a plurality of heteratomic compounds.

I have found that by directing two beams of infra-red light from a given source against cells (hereinafter referred to as "detector cells") charged with a substance having substantially the same light absorption band as that of the substance to be analyzed for, and each of which cells contains a thermocouple or an equivalent device, such as a thermopile, a bolometer, or any other device for generating or varying an electric current uniformly with change in the temperature of the detector cell; connecting the two thermocouples or their equivalents in opposition to one another with a galvanometer in the circuit and obtaining the reading; successively interposing samples of known compositions containing varying proportions of the substance to be determined by the analysis, for purpose of calibrating the readings of the galvanometer in terms of the proportion of said substance in the samples; and thereafter interposing the sample to be analyzed in the path of one of the beams of light, a reading of the galvanometer is obtained which corresponds to the proportion of said substance in the sample. Once the apparatus has been calibrated as just described, the organic mixture to be analyzed may be passed in steady flow through the sample chamber. The readings of the galvanometer then vary with change in the composition of the mixture passing through the sample chamber, and changes in the composition of the mixture are quickly and accurately indicated.

In order to obtain high sensitivity, and therefore accuracy of the readings, it is important, however, that each detector cell contain a substance which absorbs light of the same wave length as that absorbed by the substance to be determined, and that it absorb relatively little light of other wave lengths, so that any change in the current generated by the cell will be due largely to the heat energy liberated by the absorption of light of said wave length. If the light absorbed in the detector cell were to consist largely of light of varying wave lengths, especially of light of wave lengths other than that absorbed by the substance to be determined (as has been the case in certain of the photoanalytical methods heretofore known), then the change in the current or voltage generated by the cell is merely a measure of the total amount of light of all wave lengths absorbed by the sample interposed between said cell and the source of light, and accurate analysis of a sample containing more than one heteratomic substance, i. e. analysis of an organic mixture, is not possible. Also, a detector cell which absorbs light of widely varying wave lengths lacks sensitivity, even when employed for analyzing a mixture which contains only a single heteratomic substance, since the change in current or voltage developed by the cell, which is caused by interposing the sample to be analyzed between the cell and the source of light then corresponds to only a minor fraction of the total current or voltage generated by the cell.

The feature of splitting the light beam and directing one beam to one cell and the other beam to the other cell while having the cells connected through a galvanometer with their electrical potentials in opposition is important since it eliminates errors that might otherwise occur due to variations in the intensity of the light employed. Since the two cells are connected in opposition and each is exposed to light from the same source, it is only the difference in the voltage or energy output of the cells which is measured and this difference in voltage or energy is not altered appreciably by usual fluctuations in the intensity of the light employed. This arrangement also results in the elimination of "drift," i. e. changes in voltage or current developed, which are due to changes in the temperature of the room or of surrounding objects.

The voltage or amperage from the cells may be amplified if desired and may be transmitted to any of the usual devices for continuously recording the same, e. g. a device such as the well known Leeds and Northrup automatic recording potentiometer known as a "Micromax."

The electrical energy developed or transmitted by the detector cells may also be employed, preferably in amplified form, for controlling the temperature, pressure, rate of flow or other variable condition of the system for handling, e. g. producing, utilizing, or distilling, etc., the mixture which is being analyzed. Ways and means for employing a variable energy output of any system to adjust and control one or more other variables of the system are well known and are illustrated in U. S. Patent 2,118,842. Such known ways and means may be applied in conjunction with the method and apparatus herein disclosed to control the system for handling the mixture being analyzed in accordance with the composition of the latter so as to maintain uniform operation and results. Thus in continuously mixing or blending two or more organic compounds, the invention may be applied so that any slight variation in the composition of the mixture produced will result in a prompt compensating change in the flow of one or more of the components to the system so as to vary the proportions thereof toward that of the mixture which is desired. Similarly, the method may be applied in carrying out continuous distillations so as to vary the rate of feed, or the temperature, or pressure, or the amount of heat supplied to the still as necessary in order to obtain efficient fractionation.

It will be understood that the method of analysis herein disclosed permits a rapid, accurate, and continuous determination of the ingredient or ingredients of an organic mixture which have a light absorption band distinctive from those of the other ingredients of the mixture and corresponding in wave length to one of the absorption bands of the substance used in the detector cells. When the mixture to be analyzed contains only a single ingredient having said distinctive absorption band, it is the proportion of this single ingredient in the mixture which is determined, but when two or more of the ingredients of the mixture each possess this same light absorption band then it is the combined proportion of such ingredients in the mixture which is determined. Thus the method may be applied in analyzing a mixture of butylene-1, butylene-2, isobutylene, and butadiene-1.3, either to determine directly the proportion of butadiene in the mixture or to determine the combined proportion of the butylenes in the mixture. However, since the stronger light absorption bands of butylene-1, of butylene-2, and of isobutylene are practically the same, the method may not be applied satisfactorily to determine the proportion of only one of these isomers.

A single heteratomic compound may of course possess two or more light absorption bands which usually differ in intensity. Whenever possible the principal band of a compound is relied upon in carrying out an analysis by the present method. However, it sometimes happens, e. g. in the case of a mixture of normal butane and isobutane, that the principal absorption bands of the ingredients of a mixture are identical, but that one of the ingredients possesses a minor light absorption band which is distinctive. In such instance it is of course the distinctive minor light absorption band that is relied upon in carrying out the analysis and the detector cells of the apparatus are charged with a substance having said light absorption band, preferably as its principal absorption band.

Figure 2:
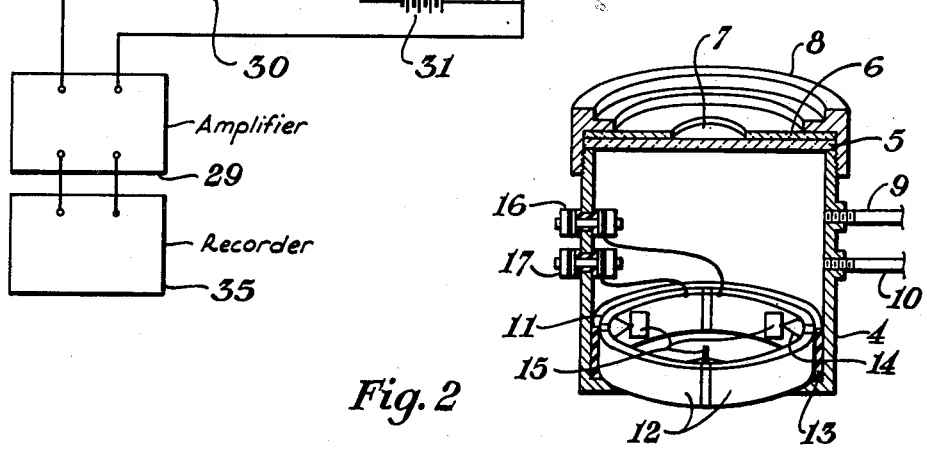
Figure 3:
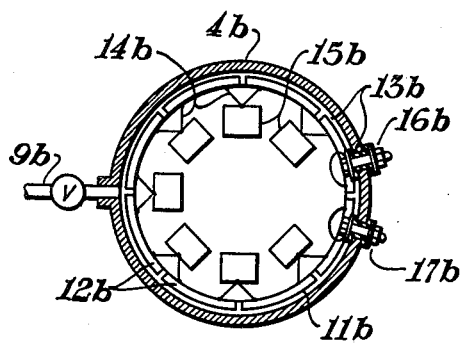
Figure 4:
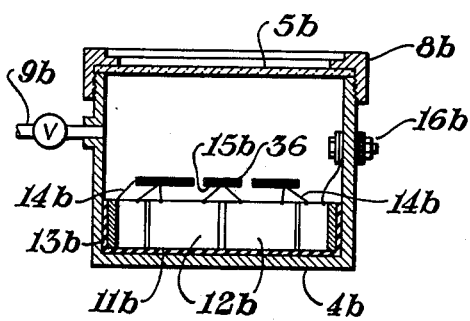
Figure 5:
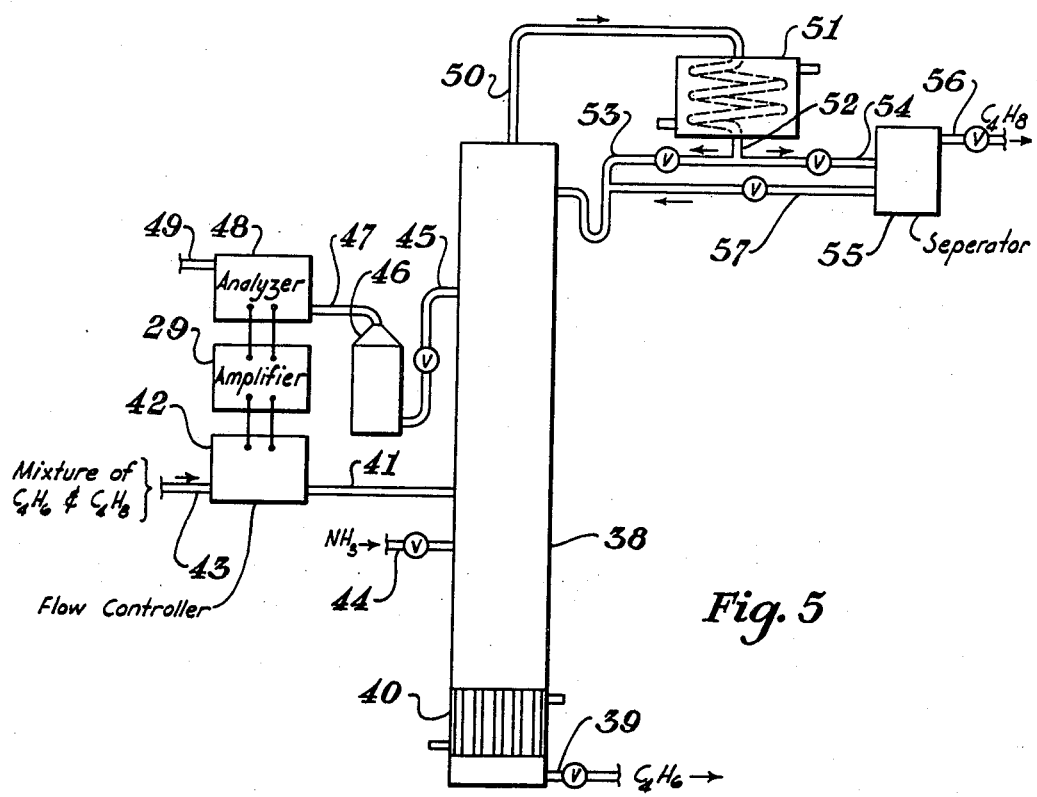

The accompanying drawings illustrate certain of the forms and arrangements of apparatus which may be employed in practicing the invention. Fig. 1 of the drawings shows a cross-sectional view of the analyzer provided by the invention, which analyzer includes the detector cells 4 and 4a, and it also shows, in diagrammatic manner, a variable electric circuit for connecting the analyzer with a usual amplifier and connections of the latter with a continuous recorder. Fig. 2, which is a side view, partly in cross section, of the detector cells 4, illustrates the electrical connections within such cell. Figs. 3 and 4 show a detector cell of different construction from those shown in Figs. 1 and 2, Fig. 3 being a top cross-sectional view of the cell and Fig. 4 being a cross-sectional side view of the same cell. Fig. 5 is a diagrammatic sketch of a continuous distillation system including the continuous analyzer connected with a usual device for automatically controlling the rate of feed to the system. The continuous distillation system shown in Fig. 5 is adapted for the azeotropic distillation of a hydrocarbon mixture using ammonia as an entraining agent. It includes certain devices not required in carrying out other fractional distillations.

In Fig. 1, the numeral 1 designates an electric lamp for generating infrared light. The numeral 2 designates an instrument case, through the walls of which extend the tubes 3 and 3a. The tubes 3 and 3a, which serve to direct light toward the detector cells 4 and 4a situated inside of the case, preferably have bright and shiny inner surfaces which will reflect much of the light striking the same. They are usually open tubes, as indicated in the drawings, although it may in some instances be advantageous to close the ends thereof with windows to prevent air circulation and consequent temperature variations. The windows, when provided, must of course be of a material which will transmit light of the wave length absorbed by the substance to be determined by the analysis and they may, if desired, be of a substance such as lithium fluoride which will serve as a light filter for screening out light of wave lengths remote from those required for the analysis.

Detector cells 4 and 4a are of similar construction. The wall of cell 4, shown in Figs. 1 and 2, is cup-shaped. A window 5 and an opaque disk 6 having a central orifice 7 are situated across the open end of cell 4 and are held in place by a ring-shaped cap 8. The window 5 may be of rock salt, or lithium fluoride or other solid substance transparent to infrared light. When assembled the cell is preferably air tight. Valved pipes 9 and 10 which extend through the walls of case 2 and cell 4 serve as an inlet and outlet for a fluid, preferably a gas or vapor, to and from the cell. Within cell 4 is a ring 11 made up in part of segments 12 of a metal such as copper, brass, or silver, etc. The segments 12 are separated from one another by an electric insulating material 13, such as glass, paper, mica, or polystyrene, etc., and the ring as a whole is separated from the walls of cell 4 by similar insulating material. Adjacent metal segments 12 of ring 11 are joined by a thermocouple 14, the two wires of which are of course of different metals, e. g. one of said wires may be of bismuth and the other of silver. A number of other combinations of metals suitable for the construction of thermocouples are well known. At the juncture of each thermocouple 14 is a thin metal fin 15, preferably having bright reflective surfaces, which fin serves to transmit heat rapidly to and from the thermocouple. The thermocouples 14 and their fins 15 are preferably protected by the opaque disk 6 from direct exposure to light entering the cell. The opposing ends of the thermopile, thus formed by connecting the several thermocouples in series through the metal segments 12 of ring 11, are connected to the terminals 16 and 17. The latter extend through the wall of cell 4 and are insulated from the latter by electric insulation. In cell 4a, the parts 5a—17a correspond to parts 5—17 of cell 4.

Interposed between tube 3 and detector cell 4 is a sample cell 18 which is provided at each end with a tightly fitting window 19 held in place by a ring-shaped cap 20. The window 19 is of course constructed of a substance such as lithium fluoride or sodium chloride which will transmit infrared light. Pipes 21 and 22, which extend through the walls of case 2 and of sample cell 18 serve as an inlet and outlet for passage of a fluid, preferably a vapor or gas, through the cell. By constructing cell 18 so that it is very shallow, preferably of depth not exceeding one millimeter, it may be adapted for the transmission therethrough of liquid mixtures which are to be analyzed.

The terminals 16 and 16a of the respective cells 4 and 4a are connected by a wire 23, or other electric conductor. The terminals 17 and 17a of said cells are connected with the respective terminals 24 and 25 which extend through the wall of instrument case 2. A shunt line 26 branching from the conductor 23 connects with another terminal 27 which also extends through the wall of instrument case 2. The tubes 3 and 3a, detector cells 4 and 4a and the sample cell 18 within case 2 are surrounded by a heat insulating material 28, such as asbestos, or rock wool, etc.

The terminals 17 and 17a of cells 4 and 4a are connected in opposition to one another with a usual device 29, such as the "photoelectric potentiometer" manufactured by the Weston Electrical Instrument Corp., for amplifying the current or voltage between the two cells. The shunt line 26 which includes a variable resistance 30, permits varying or balancing of the voltage or current delivered by cells 4 and 4a to the amplifier 29. The electric circuit illustrated in Fig. 1 of the drawings includes, as a sub-circuit, a battery or other source of current 31, the fixed resistances 32 and 33, and a variable resistance 34 which may be adjusted to maintain a small but constant current from said source through the major circuit. The inclusion of such minor current-generating circuit within the major electric circuit is desirable, since it facilitates adjustment of a continuous recording device, when employed. However, the minor circuit is not essential and it may be omitted.

The amplifier 29 is connected in Fig. 1 of the drawings with a usual device 35, e. g. a Leeds and Northrup potentiometer recorder, for continuously recording the voltage or amperage applied to the same. As is well known such recording device may be calibrated to give direct readings in terms of the value being measured, i. e. in the present instance in terms of the composition of the mixture being analyzed.

The detector cell shown in Figs. 3 and 4 may be used in place of either of the cells 4 and 4a shown in Fig. 1. In Figs. 3 and 4 the numeral 4b designates a cup-shaped cell which is provided inside its lower end with a ring 11b made up of metal segments 12b which are separated from one another and from the walls of cell 4b by the electrical insulating material 13b. The segments 12b of ring 11b are connected in series by the thermocouples 14b, thus forming a thermopile the opposing ends of which are connected with the respective terminals 16b and 17b. At the junctures of the thermocouples 14b are respective thin metal fins 15b. The surface of each such fin 15b which is exposed to light entering the cell 4b is coated with a thin layer 36 of a solid or liquid substance of low vapor pressure and having a strong light absorption band corresponding to that of the compound to be determined by the analysis. Examples of substances of which the layer 36 may be composed are paraffin wax having a light absorption band of 3.42 mu, di-(ortho-xenyl) monophenyl phosphate having an absorption band of 3.27 mu and para-tetraphenyl having an absorption band of 3.27 mu, etc. Over the open end of cell 4b is a window 5b which is held in place by a ring-shaped cap 8b. A valved tube 9b which extends through the wall of the cell may be used to evacuate the latter. The bottom inner surface of cell 4b may be blackened so that it will absorb light striking the same and will conduct away from the thermocouples 14b the heat thereby generated, but this is not essential, e. g. said surface may if desired be rendered bright and shiny so that it will reflect light.

In Fig. 5 of the drawings, the numeral 38 designates a distilling column which is provided near its lower end with a valved outlet 39 and with a source of heat 40, which may be a calandria as indicated or be a heater of other usual form, e. g. a boiler or an inlet for steam. Near its mid-section, column 38 is connected by line 41 with a usual electrically operated flow controller 42 of the type which controls the flow of a fluid in accordance with the amperage or voltage of the electric current operating the same. A number of such electrically operated flow controllers are known to the art. The flow controller 42 is provided with a fluid inlet 43. Near its mid-section column 38 is also provided with another fluid inlet 44. At a point above said inlets, a valved line 45 leads from the side of column 38 to the lower end of a scrubbing device 46 which is charged with sulphuric acid, phosphoric acid, or other nonvolatile acidic substance. A line 47 leads from the upper end of scrubber 46 and connects with a continuous analyzer 48, such as that shown in detail in Fig. 1 of the drawings. The analyzer 48 is provided with a fluid outlet 49. Analyzer 48 is joined by electrical connections with a usual amplifier 29 for amplifying the voltage or current generated by the analyzer 48. The amplifier 29 is electrically connected with the flow controller 42, and supplies the energy required to operate the latter. At its upper end column 38 is provided with a vapor line 50 which connects with a condenser 51. Line 52 leading from the condenser branches into two valved lines 53 and 54. Line 53 is a reflux line and connects with column 38 near the upper end of the latter. Line 54 connects with a separator 55, which may be a continuous separator or a usual settling chamber as desired. The separator 55 is provided near its top with a valved outlet 56 and near its lower end with a valved line 57 which connects with the reflux line 53.

The apparatus shown in the drawings is that usually employed in practicing the invention on a commercial scale. It may, however, be modified without departing from the invention. For instance, the recorder, or if desired both the recorder and the amplifier, shown in Fig. 1 may be omitted and an ordinary galvanometer which has been calibrated as hereinbefore described may be used instead. Again, in place of the particular forms of thermopile shown in the detector cells 4, 4a, and 4b, thermopiles constructed in other usual ways may be used. Furthermore, both the thermocouple, or thermopile, and the galvanometer may be replaced by a bolometer, in which case the electric current passed through the bolometer may be amplified and transmitted to the recorder 35 or to the flow controller 42. In carrying out a distillation with apparatus such as that shown in Fig. 5, both the continuous recorder 35 and the flow controller 42, or a combination of these two devices, may be employed. When only a continuous analysis of the distilling mixture is desired, the flow controller is omitted and the amplifier is instead connected with an ammeter or voltmeter. Other ways in which the apparatus of the drawings may be changed or modified will be apparent.

The separation of butylene and butadiene by fractionally distilling a mixture thereof in the presence of ammonia is described in the copending application of H. S. Nutting et al. Serial No. 287,218, filed July 29, 1939. In said application it is disclosed that a butylene and butadiene, which compounds boil at close to the same temperature and cannot satisfactorily be separated by an ordinary fractional distillation, form with ammonia minimum azeotropes which differ sufficiently in boiling points and in heats of vaporization to permit ready separation of the same by fractional distillation. The ammonia is preferably employed in the proportion required to distill together with the butylene, but it may be used in larger proportions, e. g. in amount sufficient to form azeotropes with both of the hydrocarbons present, or in excess over this amount, if desired. The distillation may be carried out at atmospheric pressure or thereabout, but occurs most favorably at pressures between 100 and 440 pounds per square inch gauge. In the copending application it is also disclosed that when carrying out such distillation in continuous manner, the still residue comprising the butadiene may be withdrawn continuously from the lower end of a distilling column and the distillate, consisting largely of butylene and ammonia, may be caused to separate into butylene and ammonia layers, e. g. by cooling, and the ammonia layer may be returned continuously to the distillation. By operating in this manner, the ammonia is recycled in the distilling system and the introduction of ammonia from an outside source may be discontinued when sufficient ammonia has been introduced to continue the azeotropic distillation. The above-mentioned copending application discloses that other mixtures of low boiling aliphatic hydrocarbons which normally distill together, but which are of different degrees of saturation, e. g. a mixture of amylene and pentadiene, or a mixture of hexylene and hexadiene, etc., may similarly be separated into its components by fractional distillation together with ammonia.

In separating such hydrocarbon mixture, e. g. a mixture of butylene and butadiene, by fractional distillation in the presence of ammonia, it is important that the distillation be controlled carefully, since the azeotropes to be separated differ only slightly in boiling point, e. g. usually by less than 3° C. The present invention provides a method and apparatus whereby the degree of fractionation obtained may be observed and recorded continuously and whereby the distillation may be controlled automatically to maintain highly efficient fractionation of the mixture. Fig. 5 of the drawings indicates the kinds and arrangement of apparatus to be employed in order to accomplish these ends.

In applying the present invention for the continuous analysis of the distilling mixture and for automatic control of the distillation during such fractional distillation of a mixture of butylene and butadiene together with ammonia in the apparatus illustrated in Fig. 5, a small portion of the distilling mixture is withdrawn continuously from column 38 through line 45 and is passed in vaporized form into the scrubber 46 where it is scrubbed with sulphuric acid, phosphoric acid, or other nonvolatile acidic substance to remove the ammonia therefrom. The remaining vapor mixture of butylene and butadiene flows to the analyzer 48 which is preferably of the construction shown in detail in Fig. 1 of the drawings. Referring now to Fig. 1, the vapors flow through the sample cell 18 where they are exposed to a beam of infrared light from source 1. The vapors flow from cell 18 through outlet 21 which corresponds to outlet 49 of Fig. 5. Light transmitted through the vapors in cell 18 enters the detector cell 4 which is filled with butylene or with another substance, e. g. butane, pentane, hexane, or other organic compound containing methyl and/or methylene radicals. All such compounds have a principal light absorption band at approximately the same wave length as that of butylene.

Another beam of infrared light from the same source is at the same time directed into detector cell 4a which is also charged with vapors of a substance having substantially the same principal light absorption band as that of butylene. The electric current or voltage generated by the detector cells 4 and 4a, which cells are connected in opposition to one another through the amplifier 29, is transmitted in amplified form either to the recorder 35 of Fig. 1 (which is, in essence, an ammeter or voltmeter designed so as to continuously record the amperage or voltage applied to the same), or to the flow controller 42 of Fig. 5, which is thereby actuated so as to regulate automatically the flow of the hydrocarbon mixture to the distilling column 38. Prior to use in the process the recorder, when employed, is of course, calibrated as hereinbefore described so as to give readings indicating the proportion of butylene in the mixture being analyzed. The flow controller 42 of Fig. 5 is adjusted so that a decrease in the proportion of butylene in the mixture being analyzed will cause a reduction in the rate of hydrocarbon feed to column 38 and will thus cause an increase in the degree of fractionation obtained. An increase in the proportion of butylene in the mixture being analyzed results, of course, in an increased flow of the hydrocarbon feed to column 38. Thus, during the distillation the flow to column 38 of a butylene-butadiene mixture of constant composition tends to fluctuate slightly about a point of balance. The flow controller 42 is preferably adjusted so that the rate of flow corresponding to this point of balance is that which results in the production of a distillate containing butylene in a form substantially free of butadiene and a residue containing butadiene in a form substantially free of butylene. If, during operation, the proportions of butylene and butadiene in the hydrocarbon feed to column 38 vary, the flow controller 42 is automatically regulated by the continuous analyzer 48 in such way as to change the rate of hydrocarbon feed to that necessary for efficient fractionation of the mixture.

It will be understood of course that instead of employing in detector cells 4 and 4a vapors of a substance having a principal light absorption band corresponding to that of butylene, the substance employed may be one having a principal light absorption band corresponding closely to that of butadiene, in which case the electric energy or potential transmitted to the recorder 35 or the flow controller 42 varies in accordance with changes in the concentration of butadiene in the sample being analyzed. In such instances, the flow controller 42 should be one which will decrease the rate of flow of hydrocarbons to column 38 in response to an increase in the proportion of butadiene in the sample being analyzed, and vice versa. Examples of substances having a principal light absorption band corresponding to that of butadiene, i. e. substances which absorb light having a wave length of approximately 3.25 mu and which may therefore be used in detector cells 4 and 4a, are benzene, cyclopentadiene, and piperylene. As hereinbefore mentioned, the detector cell 4b, shown in Figs. 2 and 3, which cell contains a solid or liquid substance having a principal light absorption band corresponding to that of the compound to be determined by the analysis, may be used in place of either of the detector cells 4 and 4a.

Instead of withdrawing the portion of the distilling mixture to be analyzed from the distilling column at a point toward the top of the latter, as indicated in Fig. 5 of the drawings, the material for analysis may, if desired, be withdrawn at other points along the column, e. g. from a point toward the lower end of the column. In practice the material for analysis is advantageously withdrawn from a section of the distilling column where the composition of the distilling mixture varies most sharply from one distilling plate to the next.

It will be understood that the variable electric current or voltage from the analyzer 48 may be amplified and employed to actuate means for automatically controlling any of the several variable conditions under which distillations are carried out, and that the above-described automatic control of the main feed to the distilling column is merely illustrative. For instance, the rate of feed to the column may be constant and the rate of withdrawal of the distillate through line 54 be automatically controlled, or both the rate of feed to the column and the reflux ratio may be constant, in which case it may be the flow of heat to the system, e. g. by means of heater 40, that is automatically controlled to obtain efficient fractionation. It will also be understood that the invention may be applied in controlling the non-azeotropic fractional distillation of simple binary organic mixtures, in which case the inlet 44 for an entraining agent, the separator 55 and the scrubber 46 of Fig. 5 may, of course, be omitted.

The continuous analyzer and control apparatus herein disclosed may be applied in analyzing other organic mixtures while in motion and in automatically controlling systems for handling such other mixtures. For instance, the invention may be applied in continuously analyzing solid mixtures, e. g. a film of a mixture of polystyrene and polymerized butadiene, and in automatically proportioning and blending the ingredients to form the desired mixture thereof. Examples of other organic mixtures which may be analyzed in accordance with the invention are liquid or gaseous mixtures of an aliphatic hydrocarbon, e. g. ethane, ethylene, propane, propylene, or butylene, and a halohydrocarbon, e. g. ethyl chloride, ethylene chloride, chloroform, or propylene chloride; mixtures of hydrocarbons of widely differing degrees of saturation such as a mixture of styrene and ethylbenzene or a mixture of ethylene and ethane; mixtures of an alcohol, such as methyl or ethyl alcohol, and an ester such as methyl formate or ethyl acetate; etc. In all such instances, it is merely necessary that two beams of infrared light from a given source be directed against two detector cells, such as cells 4 and 4a, containing a substance having a strong light absorption band corresponding to that of one of the ingredients of the mixture and connected in opposition with one another to a calibrated galvanometer, and that a sample of the mixture to be analyzed be interposed between one of the detector cells and the source of light.

Other modes and means of applying the principle of the invention may be employed instead of those explained, change being made as regards the method or apparatus herein disclosed, provided the steps or means stated by any of the following claims or the equivalent of such stated steps or means be employed.

I therefore particularly point out and distinctly claim as my invention:

1. A method for analyzing a mixture containing at least one heteratomic compound to determine the proportion of the latter in the mixture which comprises directing a beam of infrared light from a given source into each of two detector cells, each containing, under exposure to the entering light, a substance having a light absorption band corresponding closely in wave length to that of the compound to be determined by the analysis and, in contact with said substance, means for generating an electric current or potential which varies with change in the temperature of said substance, the two current-generating means being connected through an electric measuring device in opposition to one another, and interposing a sample of the mixture to be analyzed between the source of light and one of said detector cells, whereby the difference in electric energy of the two detector cells is varied in accordance with the proportion of said heteratomic compound in the sample, and the resultant change in the electric energy between the cells is indicated.

2. A method for continuously analyzing while in motion a mixture containing at least two organic compounds, one of which has a principal light absorption band distinct from those of the other components of the mixture, which comprises directing beams of infrared light from a given source into each of two detector cells containing a substance having a principal light absorption band corresponding closely in wave length to that of the component of the mixture having the distinctive light absorption band, each of which detector cells also contains in contact with said substance a thermocouple that is connected, through an electric measuring device, in opposition to the thermocouple of the other detector cell, and passing the mixture to be analyzed across one of the beams of light in a position between the source of light and one of the detector cells, whereby the difference between the electric potential of the thermocouples in the respective detector cells is varied in accordance with the proportion in said mixture of the compound having the distinctive light absorption band and is continuously indicated by the electric measuring device.

3. A method as described in claim 2 wherein the mixture to be analyzed comprises an olefine and a diolefine.

4. A method as described in claim 2 wherein the mixture to be analyzed consists largely of butadiene-1.3 and at least one butylene and the electric measuring device is a continuous recorder which is calibrated to indicate the proportion of one of the compounds, butylene and butadiene, in said mixture.

5. In a method wherein an organic mixture, at least one component of which possesses a light absorption band distinctive from that of another component of the mixture, is handled in a continuous manner and wherein an electrical control-means is rendered responsive to the departure of the mixture from a predetermined ratio of its constituents, the steps of directing beams of infrared light from a common source into each of two detector bodies having a light absorption band corresponding closely in wave length to that of the component of the organic mixture having said distinctive light absorption band, passing between the source of light and one of said detector bodies a portion of said organic mixture, generating an electric potential in each of said detector bodies proportional to the change in temperature thereof resulting from absorption of the light, and applying in opposed relation to one another the electric potentials thus generated to the electrical means to energize the latter.

6. In a method wherein a mixture comprising an olefinic hydrocarbon and a diolefinic hydrocarbon is fractionally distilled in continuous manner and the distillation is automatically controlled by an electrical control system which is responsive to a departure of a variable distillation condition from a predetermined value, the steps of directing beams of infrared light from a common source into each of two detector bodies having a strong light absorption band corresponding closely in wave length to a distinctive light absorption band of one of said hydrocarbons, passing between the source of light and one of said detector bodies vapors of the material being distilled, generating an electric potential in each of said detector bodies proportional to the change in temperature thereof resulting from absorption of the light, and applying, in opposed relation to one another the electric potentials thus generated to the electrical control system to energize the latter.

7. In a method wherein a hydrocarbon mixture consisting largely of butadiene-1.3 and at least one of the butylenes is fractionally distilled together with ammonia in continuous manner and the distillation is controlled by automatic control of the rate of flow of the hydrocarbon mixture to the distillation by an electrical control system which is responsive to a departure of the rate of flow from a predetermined value, the steps of directing beams of infrared light from a common source into each of two detector bodies having a strong light absorption band corresponding closely in wave length to a distinctive light absorption band of one of the above-named kinds of unsaturated hydrocarbons, passing vapors from the distillation mixture between the source of light and one of the detector bodies, generating an electric potential in each detector body proportional to the change in temperature thereof resulting from absorption of the light, and applying in opposed relation to one another, the electric potentials thus generated to the electrical control system to energize the latter.

8. A method for analyzing a fluid mixture containing at least one heteratomic compound to determine the proportion of the latter in the mixture, which method comprises directing beams of infrared light from a common source into each of two detector bodies containing a substance having a light absorption band corresponding closely in wave length to that of the compound to be determined by the analysis, varying an electric current or potential from each of said bodies to an extent proportional to the change in temperature of the body resulting from absorption of the light, the electric potentials from the bodies being opposed to each other, interposing a body of the fluid mixture to be analyzed between the source of light and one of the detector bodies, measuring the degree of unbalance of the opposed electric currents or potentials caused by the light absorption of said interposed body, and comparing the value so obtained to calibrated values indicating the percentage of said heteratomic compound in the mixture.

9. A method for continuously analyzing while in motion a fluid mixture containing at least two heteratomic compounds, one of which has a principal light absorption band distinct from those of the other components of the mixture, which comprises directing beams of infrared light from a common source into each of two detector bodies of a substance having a light absorption band corresponding closely in wave length to that of the compound to be determined by the analysis, varying an electric current or potential from each of said bodies to an extent proportional to the change in temperature of the body resulting from absorption of the light, the electric potentials from the bodies being opposed to each other, interposing a body of the fluid mixture to be analyzed between the source of light and one of the detector bodies, measuring the degree of unbalance of the opposed electric currents or potentials caused by the light absorption of said interposed body, and comparing the value so obtained to calibrated values indicating the percentage of said heteratomic compound in the mixture.

10. An apparatus for determining the proportion in an organic mixture of a component thereof having a light absorption band distinct in wave length from those of the other components which comprises a source of infrared light, two detector cells each positioned so as to receive light from said source, each of which detector cells contains in a position such as to be exposed to entering light a substance having a light absorption band of approximately the same wave length as said distinctive light absorption band and each of which cells also contains a temperature-responsive means for varying an electric current or potential across the same, said temperature-responsive means in the respective cells being connected through an electric measuring device in opposition to one another, and, interposed between said source of light and one of said detector cells, means for exposing the organic mixture to a beam of light.

11. An apparatus for determining the proportion in an organic mixture of a component thereof having a light absorption band distinct in wave length from those of the other components which comprises a source of infrared light, two detector cells each positioned so as to receive light from said source, each of which detector cells contains in a position such as to be exposed to entering light a substance having a light absorption band of approximately the same wave length as said distinctive light absorption band and each of which detector cells also contains at least one thermocouple, the thermocouples of the respective cells being connected through an electric measuring device in opposition to one another, and, interposed between said source of light and one of said detector cells, means for exposing the organic mixture to a beam of the light.

12. An apparatus as described in claim 11 wherein the means for exposing the mixture to the light is a chamber having an inlet and outlet for passage of a fluid therethrough and having windows for transmitting light through the chamber.

NORMAN WRIGHT.